United States Patent [19]

Sato

[11] Patent Number: 5,418,341
[45] Date of Patent: May 23, 1995

[54] MINIATURIZED INCREMENTAL ENCODER

[75] Inventor: Jun Sato, Tsuyama, Japan

[73] Assignee: Matsushita Electric Industrial Co., Ltd., Kadoma, Japan

[21] Appl. No.: 179,934

[22] Filed: Jan. 11, 1994

[30] Foreign Application Priority Data

Jan. 13, 1993 [JP] Japan .................. 5-003783

[51] Int. Cl.$^6$ .................. H01H 19/54; H01H 9/00
[52] U.S. Cl. .................. 200/11 R; 200/11 DA; 200/11 TW; 200/292
[58] Field of Search .............. 200/4, 5 R, 11 R, 11 D, 200/11 DA, 11 G, 11 J, 11 K, 314–316, 329, 292

[56] References Cited

U.S. PATENT DOCUMENTS

| 3,030,460 | 4/1962 | Huetten et al. | 200/11 D |
| 3,736,390 | 5/1973 | Lockard | 200/11 DA |
| 4,135,065 | 1/1979 | Nicot | 200/11 DA |
| 4,145,585 | 3/1979 | Iwasaki | 200/11 DA |
| 4,443,670 | 4/1984 | Nakamura et al. | 200/11 DA |
| 4,511,879 | 4/1985 | Fujii | 338/174 |
| 4,591,674 | 5/1986 | Rose et al. | 200/11 DA |
| 4,625,084 | 11/1986 | Fowler et al. | 200/11 DA |
| 4,743,736 | 5/1988 | Albinger, Jr. et al. | 200/11 DA X |
| 4,777,483 | 10/1988 | Fowler | 200/11 TW X |

FOREIGN PATENT DOCUMENTS 1-64015  4/1989  Japan .
2-69712  5/1990  Japan .
3-134515  6/1991  Japan .

Primary Examiner—J. R. Scott
Attorney, Agent, or Firm—Renner, Otto, Boisselle & Sklar

[57] ABSTRACT

In an incremental encoder, a common terminal which is required always to be electrically connected to a rotary contact plate comprises a plurality of sliding contacts each having a contact point with the rotary contact plate. Respective sliding contacts are positioned so as to come into contact with the rotary contact plate with a positional shift angle. Due to this feature, even in the case where the common terminal is in contact with a signal pulse-generating region of the rotary contact plate having slits formed therein for generating the signal pulse, it is possible that a portion of at least one of the contact points provided on the plurality of sliding contacts is always in contact with the rotary contact plate. Accordingly, a common contact region which is required in a conventional incremental encoder is not necessary, whereby the miniaturization of the incremental encoder can be realized. As far as the common terminal is modified so as to be always in contact with the rotary contact plate, the same advantage can be obtained.

8 Claims, 2 Drawing Sheets

MINIATURIZED INCREMENTAL ENCODER

BACKGROUND OF THE INVENTION

1. Field of the Invention

The present invention relates to an incremental encoder used for audio acoustic devices, measurement instruments and the like. In particular, the present invention relates to a miniaturized incremental encoder obtained by improving the shape of a common terminal.

2. Description of the Related Art

An incremental encoder (hereinafter, referred to as an encoder) is attached to a rotor of a rotating machine such as a motor and a generator, and generates a pulse signal in accordance with the rotation state. The pulse signal is used for detecting the rotation speed of the rotating machine and regulating its rotation.

The structure of a conventional encoder and an example of its output-signal waveform will be described with reference to FIGS. 5 and 6.

The encoder shown in FIG. 5 comprises a rotary contact plate 50, a signal-generating terminal 54 and a common terminal 55.

The rotary contact plate 50 includes a signal pulse-generating region 51 and a common contact region 52 in which the signal pulse-generating region 51 comprises slits 51a and spoke-shaped conductive regions 51b alternately formed therein. The spoke-shaped conductive regions 51b space the respective slits 51a from each other. The number of the slits 51a and the spoke-shaped conductive regions 51b are designed in accordance with the number of pulses which should be generated for each rotation. Each slit 51a is filled with a resin, making the rotary contact plate 50 a plane. The rotary contact plate 50 is fixed to a rotor 53 having a rotary operation axis 53 by an insert molding method or the like.

The signal-generating terminal 54 which comprises a sliding contact 54a for generating an A phase signal and a sliding contact 54b for generating a B phase signal is positioned so as to come into contact with the signal pulse-generating region 51 of the rotary contact plate 50. Further, the sliding contacts 54a and 54b are positioned so as to come in contact with the rotary contact plate 50 with a positional shift angle x corresponding to a phase difference to exist between the A phase signal and the B phase signal.

On the other hand, the common terminal 55 is positioned so as to be always in contact with the common contact region 52 of the rotary contact plate 50, whereby a constant reference potential is provided.

When the rotating machine rotates, the rotary contact plate 50 also rotates through the rotor 53 about the rotary operation axis 53'.

The sliding contacts 54a and 54b are successively connected to the common terminal 55 through the rotary connect plate 50, whereby an output waveform shown in FIG. 6 is obtained. In this case, for example, if the widths of the spoke-shaped conductive region 51b and the slit 51a are 4° and 8° respectively, an A phase-signal waveform 61 and a B phase-signal waveform 62 are plus waveforms having an ON width of 4° and an OFF width of 8° respectively.

In FIG. 6, the phase difference between the A phase-signal waveform 61 and the B phase-signal waveform 62 corresponds to the positional shift angle x between the sliding contact 54a for generating the A phase signal and the sliding contact 54b for generating the B phase signal. Accordingly, in the exemplary encoder shown in FIG. 5, since the positional shift angle x between the sliding contacts 54a and 54b is 2°, the phase difference between the A phase-signal waveform 61 and the B phase-signal waveform 62 is also 2°.

However, in the above-mentioned conventional encoder, the rotary contact plate 50 must be equipped with the common contact region 52. Thus, the miniaturization of the conventional encoder is limited.

In order to solve this problem and provide a miniaturized encoder in which a plurality of signal pulses having phase differences can be output, Japanese Laid-Open Utility Model Publication No. 1-64015 discloses an encoder requiring no rotary contact plate.

The encoder disclosed in this prior art includes, in place of the rotary contact plate, a signal pulse-generating band and a common contact band provided in the side portions of the rotor 53. The signal pulse-generating band and the common contact band are around the rotor. The signal pulse-generating band is coated with a conductive material and an insulating material alternately and the common truck band is coated with a conductive material.

Further, the encoder includes a plurality of signal-detecting brushes and a common terminal brush, the former being in contact with the signal pulse-generating band and the latter being in contact with the common contact band.

When the rotating machine rotates and then in turn the encoder rotates about the rotary operation axis, each signal-detecting brush alternately touches the conductive material and the insulating material. Since the common terminal brush is always in contact with the conductive material and provides a constant reference potential, a pulse-voltage waveform having a period corresponding to the number of rotation of the rotation axis can be obtained by the combination of the output voltage of the signal-detecting brushes and the common terminal brush. The adjustment of relative positions of the plurality of signal-detecting brushes makes it possible to output a plurality of pulse signal waveforms having the desired phase differences.

Since the encoder disclosed in the prior art requires no rotary contact plate, it is possible to miniaturize the encoder in a radius direction. However, the signal pulse-generating band and the common contact band should be formed on the rotary operation axis, making it difficult to miniaturize the encoder in an axis direction. Oppositely, the encoder might become longer in the axis direction, compared with the conventional encoder.

SUMMARY OF THE INVENTION

An incremental encoder according to the present invention comprises: a rotary operation axis; a rotary contact plate which is equipped with the rotary operation axis and rotates with the rotary operation axis, wherein the rotary contact plate comprises a signal pulse generating region having a plurality of slits formed with a fixed interval in a radial manner and a plurality of spoke-shaped conductive regions respectively spacing the plurality of slits; and a common terminal which has a contact point provided on its tip portion, at least a portion of the contact point being always in contact with the spoke-shaped conductive region of the signal pulse generating region of the rotary contact plate, at least while the rotary contact plate rotating.

In one embodiment of the invention, the common terminal is made of an silver-nickel alloy.

In another embodiment of the invention, the contact point of the common terminal is plated with silver.

In still another embodiment of the invention, the common terminal comprises a plurality of interdigital sliding contacts respectively each having the contact point provided on its tip portion.

In still another embodiment of the invention, the plurality of interdigital sliding contacts are four interdigital sliding contacts.

In still another embodiment of the invention, the four interdigital sliding contacts are positioned so that every two optional sliding contacts are paired.

In still another embodiment of the invention, the tip portion of the common terminal is processed into a strip-shape, each strip-shaped tip having the contact point with the rotary contact plate, at least one of the contact point always being in contact with the spoke-shaped conductive region of the signal pulse generating region of the rotary contact plate, at least while the rotary contact plate is rotating.

Thus, the invention described herein makes possible the advantage of providing an incremental encoder which does not have a common contact region on a rotary contact plate, whereby miniaturization of the incremental encoder becomes possible.

This and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of examples, with reference to the accompanying drawings.

EXAMPLE 1

Figure 1:
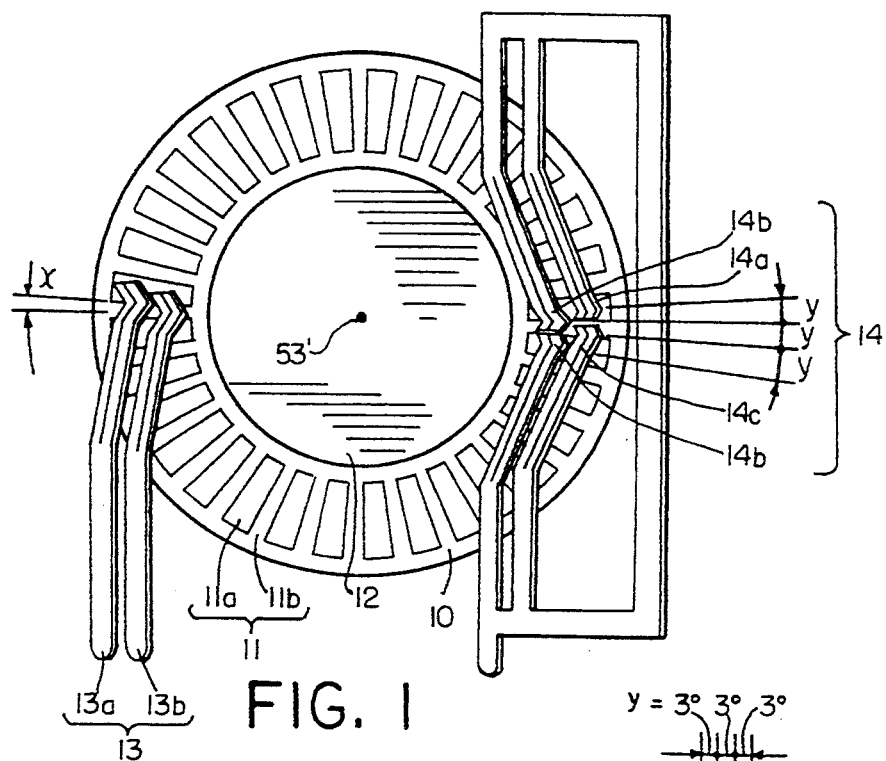
FIG. 1 is a diagram showing the relationship between a rotary contact plate and terminals of an incremental encoder of one example of the present invention.

FIG. 1 shows a first example of an encoder of the present invention.

The encoder of this example comprises a rotary contact plate 10, a signal-generating terminal 13 and a common terminal 14.

The rotary contact plate 10 having a width of 0.15 mm and a diameter of 10.6 mm is made of a silver-plated phosphor bronze. The rotary contact plate 10 includes a signal pulse-generating region 11 in which a plurality of slits 11a each having a width of 0.42 to 0.68 mm and a length of 2 mm and a plurality of spoke-shaped conductive regions 11b each having a width of 0.21 of 0.34 mm and a length of 2 mm are alternately formed in a radial manner. Exact values of the width of the slits 11a and the spoke-shaped conductive regions 11b are designed in accordance with a desired ON width and a desired OFF width of a signal pulse waveform generated by the encoder, as described later.

The rotary contact plate 10 is fixed to a rotor 12 which rotates about a rotary operation axis 53 by an insert molding method or the like. Each slit 11a is filled with a resin (preferably with a polyacetals), making a surface of the rotary contact plate 10 a plane.

Figure 5:
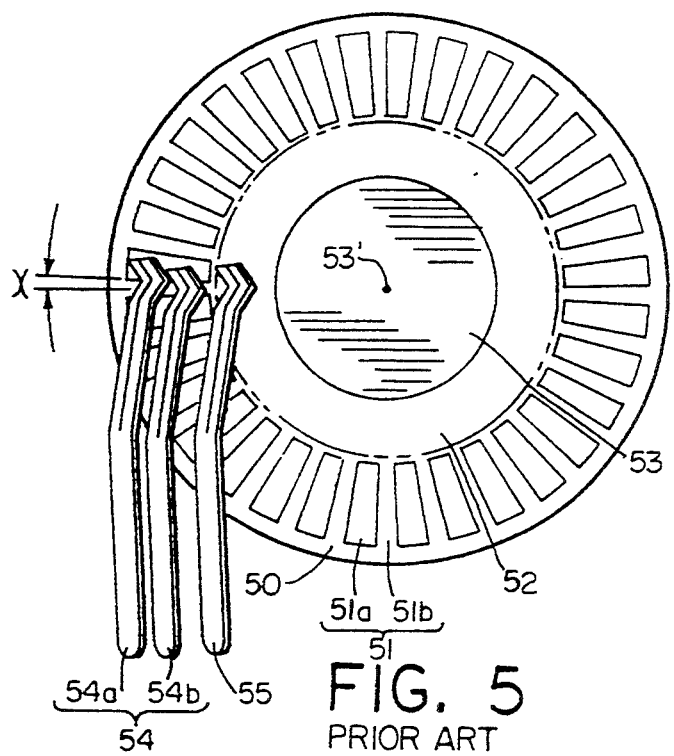
FIG. 5 is a diagram showing the relationship between a rotary contact plate and terminals of a conventional incremental encoder.
Figure 6:
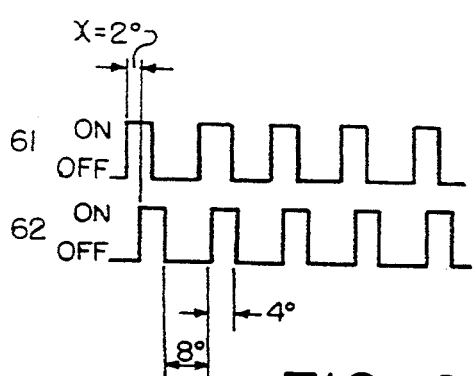
FIG. 6 is a waveform diagram of an output pulse signal of the conventional incremental encoder shown in FIG. 5.

What is different from the rotary contact plate 50 used for a conventional encoder (as shown in FIG. 5) is that the rotary contact plate 10 of the present example does not comprise the common contact region 52 (see FIG. 5).

On the contrary, as shown in FIG. 1, the signal-generating terminal 13 comprises a sliding contact 13a for generating an A phase signal and a sliding contact 13b for generating a B phase signal as similar to the conventional encoder. The sliding contacts 13a and 13b are positioned so as to come into contact with the signal pulse-generating region 11 of the rotary contact plate 10 with a positional shift angle x of 2° corresponding to a phase difference to exist between the A phase signal and the B phase signal.

The most remarkable difference between the encoder of the present invention and that of the conventional technique lies in the shape of the common terminal 14. According to the present example, the common terminal 14 has four common sliding contacts 14a to 14d which are positioned so as to come into contact with the signal pulse-generating region 11 of the rotary contact plate 10 with a positional shift angle of 3° (=y), respectively.

Next, the operation of the encoder of the present invention as shown in FIG. 1 will be described.

Figure 2:
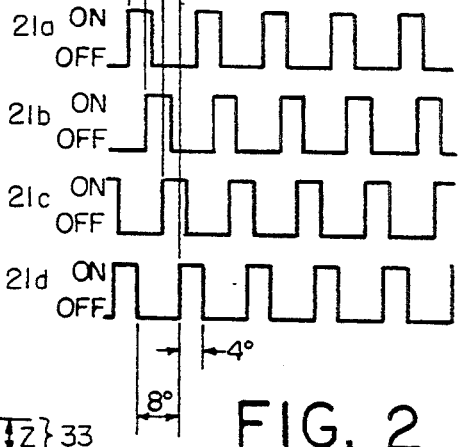
FIG. 2 is a pulse waveform diagram showing an electrical conducting state between each common sliding contact and a rotary contact plate of the incremental encoder shown in FIG. 1.

If the encoder is designed to generate 30 pulses having an ON width of 4° and an OFF width of 8° for each rotation, each slit 11a having a width of 8° is formed by 12° in the signal pulse-generating region 11. The electrical conducting state between the respective common sliding contacts 14a to 14d and the rotary contact plate 10 during the rotation of the rotary contact plate 10 is shown in FIG. 2. Namely, respective sliding contacts 14a to 14d have a pulse-like electrical conducting state corresponding to the widths of the slit 11a and the spoke-shaped conductive region 11b of the signal pulse-generating region 11. In FIG. 2, reference numbers 21a to 21d represent an electrical conducting state between the respective sliding contacts 14a to 14d and the rotary contact plate 10 as shown in FIG. 1.

However, in the present example, the positional shift angle y of the respective common sliding contacts 14a to 14d is 3° with respect to the rotary contact plate 10, which is smaller than the width of each slit 11a (=4°). Therefore, before one of the common sliding contacts is detached from the rotary contact plate 10, another one of common sliding contacts comes into contact with the rotary contact plate 10. As a result, at least one of the common sliding contacts 14a to 14d is always in contact with the rotary contact plate 10. Thus, regarded as the whole common terminal 14, the electrical conducting state between the common terminal 14 and the rotary contact plate 10 can always be maintained.

As a result, according to the present example, although the common terminal 14 is in contact with the signal pulse-generating region 11 having a plurality of slits 11a, the same A phase-signal waveform and B phase-signal waveform as those of the conventional example as shown in FIG. 5 in which the common terminal 55 is in contact with the common contact region 52 can be obtained. That is, the encoder of the present example requires no common contact region 52 which is necessary for the conventional encoder, therefore the miniaturization of the encoder can be realized.

In FIG. 1, the common sliding contacts 14a to 14d are positioned so that every two sliding contacts are paired; however, four sliding contacts can be arranged in parallel.

The widths of the slit 11a and the spoke-shaped conductive region 11b, the number of the common sliding contacts 14a to 14d, and the positional shift angle y between the common sliding contacts 14a to 14d are not limited to the above description and they can be optionally selected depending on the necessity in view of the structure of the encoder, as long as at least one of the common sliding contacts 14a to 14d is always in contact with the rotary contact plate 10.

For example, in the case where the encoder is designed to generate 50 pulses (the ratio of the ON width to the OFF width is 50%) for each rotation, each slit 11a having a width of 3.6° is formed by 7.2° in the signal pulse-generating region 11. In the case where the common terminal 14 comprises three common sliding contacts, if the respective common sliding contacts are positioned with a positional shift angle of 2.4° (=y) among them, the electrical conducting state between the common terminal 14 and the rotary contact plate 10 can always be maintained regarding the whole common terminal 14, as in the above-mentioned example.

In this example, the sliding contact 13a for generating the A phase signal, the sliding contact 13b for generating the B phase signal and the respective common sliding contacts 14a to 14d are prefererably made of a silver-nickel alloy, and the rotary contact plate 10 is preferably made of a phosphor bronze; however other materials can be used as long as it has an appropriate value of conductivity and an appropriate characteristic as a spring.

It is preferred that contact points of respective sliding contacts 13a, 13b and 14a to 14d are plated with silver for the purpose of improving their conductivity. In addition, the plated layer of the contact point may be further subjected to gold plating. The gold plating prevents the generation of corrosive products on the contact points, whereby the performance of the encoder will be improved regarding the operative life time at the contact points and the restraint of noise in the signal pulse. The surface of the spoke-shaped conductive regions 11b can be also subjected to the similar plating treatment.

EXAMPLE 2

Figure 3:
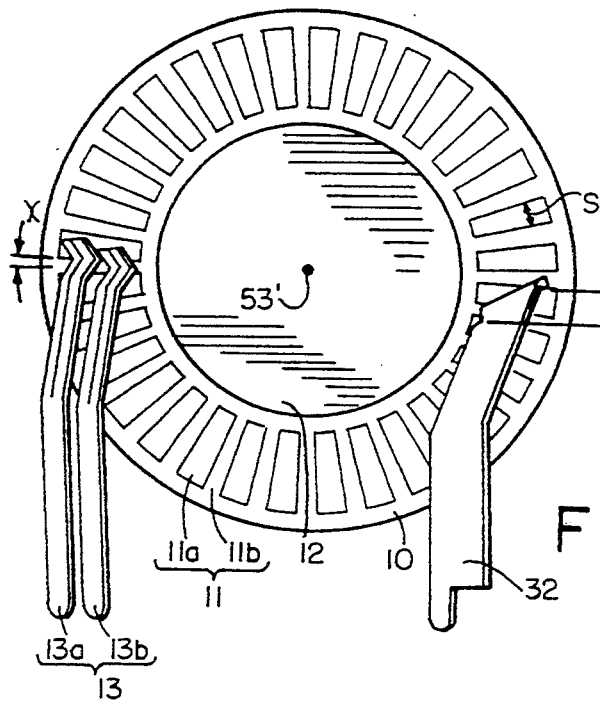
FIG. 3 is a diagram showing the relationship between a rotary contact plate and terminals of an incremental encoder of another example of the present invention.

The relationship between the rotary contact plate and a common terminal in another example of the present invention will be shown with reference to FIG. 3.

In the first example as shown in FIG. 1, the common terminal 14 comprises four interdigital common sliding contacts 14a to 14d. On the contrary, as shown in FIG. 3, a common terminal 32 of this example becomes one sliding contact. The tip portion of the common terminal 32 becomes a contact point 33 between the common terminal 32 and the rotary contact plate 10, the length of the contact point 33 being z. In this case, when the length z is larger than the width s of the slit 11a, a portion of the common terminal 32 is always in contact with the spoke-shaped conductive regions 11b, as in the above-mentioned first example, although the common terminal 32 is in contact with the signal pulse-generating region 11 having the slits 11a. Accordingly, the common terminal 32 and the rotary contact plate 10 can always be electrically connected.

In the first example as shown in FIG. 1, high accuracy of the shape is required for an interval among the common sliding contacts 14a to 14d or the like during the formation thereof. However, in the present example as shown in FIG. 3, the whole tip portion of the common terminal 32 becomes one contact point 33. Thus, the formation of the shape of the common terminal 32 of this example is not complicated, making it possible to reduce the production cost.

In addition, the same material as shown in the first example can be used for a signal-generating terminal 13 in the present example. Moreover, features regarding materials for respective sliding contacts 13a, 13b, 14a to 14d and the rotary contact plate 10 are the same as in the first example.

EXAMPLE 3

Figure 4:
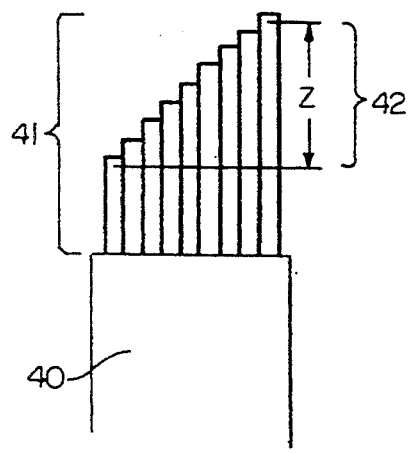
FIG. 4 is a diagram showing the shape of a common terminal of an incremental encoder of still another example of the present invention.

FIG. 4 shows the shape of a tip portion of a common terminal 40 in still another example of the present invention. In the example shown in FIG. 3, the contact point 33 is obtained by processing a metal plate without changing the shape of the metal plate significantly. However, in the present example, a tip portion 41 of the common terminal 40 is processed into a strip-shape in which a contact point 42 is formed on each strip. When the length z shown in FIG. 4 is designed so as to be larger than the width of the slit 11a (see s in FIG. 3) of the signal-generating region 11 of the rotary contact plate 10 (not shown in FIG. 4), the common terminal 40 can always be electrically connected to the rotary contact plate 10 as in the first and the second examples.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An incremental encoder for use with a prime mover rotatable about a rotary operation axis, comprising:

a rotary contact plate which is coupled to the prime mover and rotates with the prime mover about the rotary operation axis, wherein the rotary contact plate comprises a signal pulse generating region, the signal pulse generating region having a plurality of slits formed with a fixed interval in a radial manner and a plurality of spoke-shaped conductive regions respectively spaced by the plurality of slits;

a signal generating terminal for contacting the signal pulse generating region; and a common terminal which has a contact point provided on its tip portion, at least a portion of the contact point being shaped to engage in make-before-break contact with said spoke-shaped conductive regions so as to always be in contact with at least one of the spoke-shaped conductive regions of the signal pulse generating regions of the rotary contact plate while the rotary contact plate is rotating.

2. An incremental encoder according to claim 1, wherein the common terminal is made of a silver-nickel alloy.

3. An incremental encoder according to claim 1, wherein the contact point of the common terminal is plated with silver.

4. An incremental encoder according to claim 1, wherein the common terminal comprises a plurality of interdigital sliding contacts respectively each having the contact point provided on its tip portion, said contacts sliding across the signal pulse generating region as the rotary contact plate rotates relative to the common terminal.

5. An incremental encoder according to claim 4, wherein the plurality of interdigital sliding contacts are four interdigital sliding contacts.

6. An incremental encoder according to claim 5, wherein the four interdigital sliding contacts are positioned so that every two opposing sliding contacts are paired.

7. An incremental encoder according to claim 1, wherein the tip portion of the common terminal is processed into a plurality of strips, each strip including a portion of the contact point with the rotary contact plate, at least one of the portions of the contact point always being in contact with the spoke-shaped conductive regions of the signal pulse generating region of the rotary contact plate while the rotary contact plate is rotating.

8. An incremental encoder according to claim 1, wherein the tip portion of the common terminal is in the form of a single plate-like sliding contact.

* * * * *